(12) United States Patent
Chakraborty et al.

(10) Patent No.: US 10,997,221 B2
(45) Date of Patent: May 4, 2021

(54) INTELLIGENT QUESTION ANSWERING USING MACHINE READING COMPREHENSION

(71) Applicant: Microsoft Technology Licensing, LLC, Redmond, WA (US)

(72) Inventors: Doran Chakraborty, San Jose, CA (US); Manish Malik, Cupertino, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 202 days.

(21) Appl. No.: 15/947,810

(22) Filed: Apr. 7, 2018

(65) Prior Publication Data

US 2019/0311064 A1    Oct. 10, 2019

(51) Int. Cl.
| | | |
|---|---|---|
| *G06F 16/00* | (2019.01) | |
| *G06F 16/332* | (2019.01) | |
| *G06F 16/9032* | (2019.01) | |
| *G06N 20/00* | (2019.01) | |
| *G06F 16/35* | (2019.01) | |
| *G06F 16/2457* | (2019.01) | |
| *G06F 16/33* | (2019.01) | |
| *G06F 16/9038* | (2019.01) | |

(52) U.S. Cl.
CPC .... *G06F 16/3329* (2019.01); *G06F 16/24578* (2019.01); *G06F 16/3344* (2019.01); *G06F 16/35* (2019.01); *G06F 16/355* (2019.01); *G06F 16/90332* (2019.01); *G06N 20/00* (2019.01); *G06F 16/9038* (2019.01)

(58) Field of Classification Search
CPC .................................................. G06F 16/3329
USPC .......................................... 707/723, 706, 736
See application file for complete search history.

(56) References Cited

U.S. PATENT DOCUMENTS

| | | | |
|---|---|---|---|
| 9,031,950 B1 | 5/2015 | Pragada et al. | |
| 2010/0169309 A1* | 7/2010 | Barrett | G06F 16/3331 707/736 |
| 2012/0078889 A1* | 3/2012 | Chu-Carroll | G06F 16/248 707/723 |
| 2014/0272909 A1* | 9/2014 | Isensee | G09B 7/02 434/362 |

(Continued)

OTHER PUBLICATIONS

"International Search Report and Written Opinion Issued in PCT Application No. PCT/US19/024180", dated Jul. 2, 2019, 12 Pages.

(Continued)

*Primary Examiner* — Chelcie L Daye
(74) *Attorney, Agent, or Firm* — Medley, Behrens & Lewis, LLC

(57) ABSTRACT

Representative embodiments disclose mechanisms to provide direct answers to a query submitted by a user. The mechanisms are tailored so that the answers presented have a high confidence of being correct. A plurality of document segments that are relevant to the query are selected. The selected segments are submitted to a trained machine reading comprehension model along with the query. The result is an extracted answer for one or more of the submitted segments. A subset of the extracted answers are clustered and an answer for each cluster having at least a threshold number of answers are selected as direct answers. The direct answers are presented in a format suitable to the number of selected direct answers.

20 Claims, 11 Drawing Sheets

(56) References Cited

U.S. PATENT DOCUMENTS

2015/0254353 A1* 9/2015 Gulwani ............ G06F 16/90344
707/706

OTHER PUBLICATIONS

"Microsoft Machine Reading Comprehension Dataset", Retrieved from <<http://www.msmarco.org/>>, Retrieved on: Feb. 6, 2018, 1 Page.

"R-Net: Machine Reading Comprehension with Self-matching Networks", Retrieved from <<https://www.microsoft.com/en-us/research/wp-content/uploads/2017/05/r-net.pdf>>, May 6, 2017, 11 Pages.

"SQUAD—The Stanford Question Answering Dataset", Retrieved from <<https://rajpurkar.github.io/SQuAD-explorer/>>, Retrieved on: Sep. 28, 2017, 6 Pages.

Hachman, Mark, "How Microsoft is Wading into 'Fake News' with Bing Opinion-based Search Results", Retrieved from <<https://www.pcworld.com/article/3242684/data-center-cloud/microsofts-wading-into-fake-news-with-bings-opinion-based-search-results.html>>, Dec. 15, 2017, 15 Pages.

Sherr, et al., "Microsoft is using AI to Bring Nuance to our Search Results", Retrieved from <<https://www.cnet.com/au/news/microsoft-is-using-ai-to-bring-nuance-to-our-search-results-google/>>, Dec. 14, 2017, 8 Pages.

Cho, et al. "Learning Phrase Representations using RNN Encoder-Decoder for Statistical Machine Translation", arXiv:1406.1078v3 [cs.CL] Sep. 3, 2014, 15 pages.

* cited by examiner

INTELLIGENT QUESTION ANSWERING USING MACHINE READING COMPREHENSION

FIELD

This application relates generally to answer engines. More specifically, in some aspects, this application relates to using a trained machine reading comprehension model to help answer questions submitted by a user and to formatting and displaying such answers as part of returned search results.

BACKGROUND

Users today have high expectations that systems they interact with will be able to perform tasks and answer questions. For example, a user may desire a digital assistant or search service to answer a question such as "How tall is Mount Everest?" or "What is the capital city of Tanzania?". Users expect not only accuracy but also responsiveness when such questions are answered. They tend to have a low tolerance for incorrect answers or a system that takes too long to return an answer.

It is within this context that the present embodiments arise.

DETAILED DESCRIPTION

Figure 1:
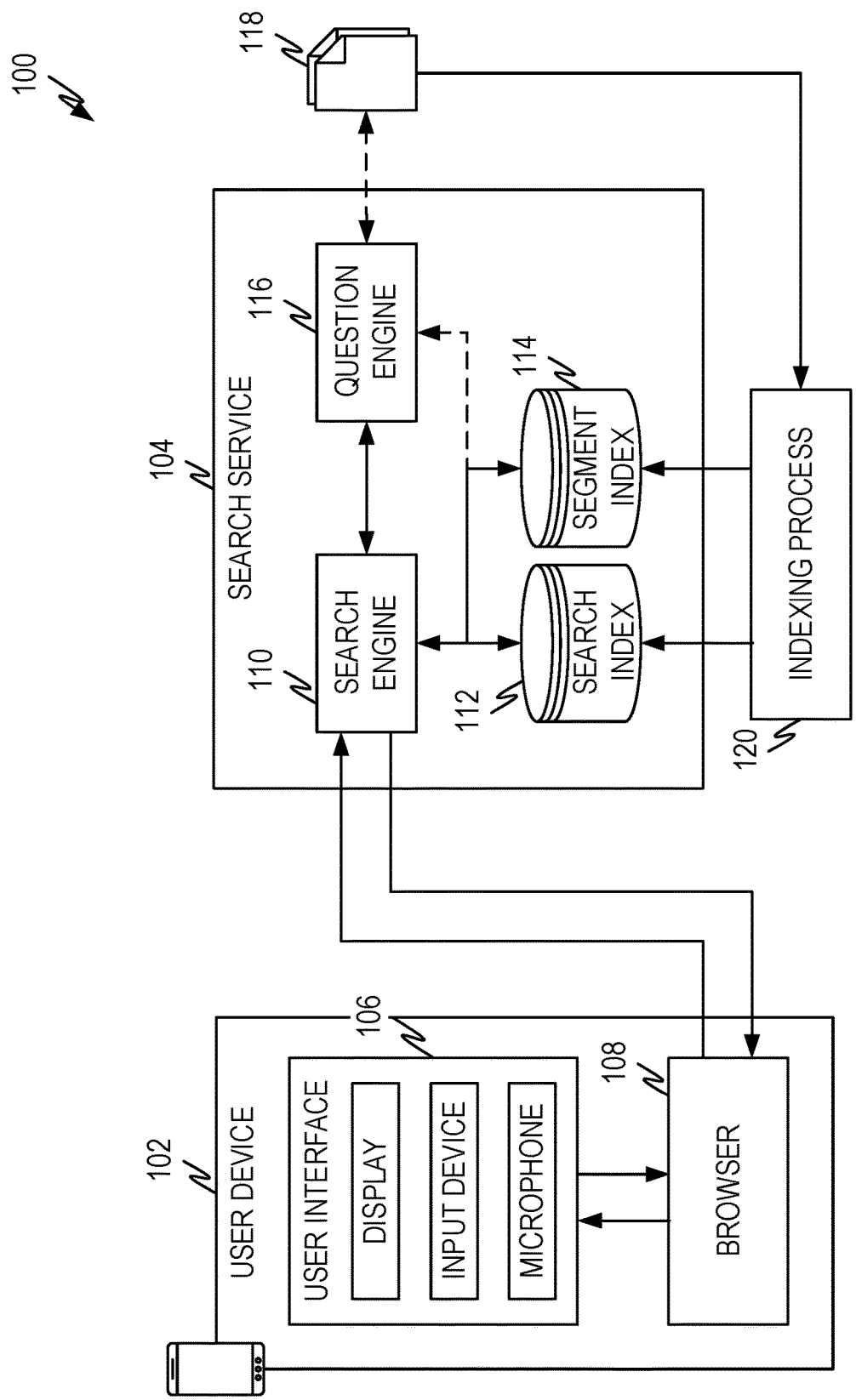
FIG. 1 illustrates a representative system architecture according to some aspects of the present disclosure.

The description that follows includes illustrative systems, methods, user interfaces, techniques, instruction sequences, and computing machine program products that exemplify illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

OVERVIEW

The following overview is provided to introduce a selection of concepts in a simplified form that are further described below in the Description. This overview is not intended to identify key features or essential features of the claimed subject matter, nor is it intended to be used to limit the scope of the claimed subject matter. Its sole purpose is to present some concepts in a simplified form as a prelude to the more detailed description that is presented later.

Users can submit questions and/or queries (hereinafter collectively referred to as queries) to a number of systems such as internet search services, personal digital assistants, answer services and so forth in an attempt to gain an answer to the question and/or query. Users want the answer to the query to be presented quickly (i.e., in real time or in near real time) without undue delay. Furthermore, users expect accurate answers. Thus, when a user submits the query, "how tall is mount Kilimanjaro?" the user expects an accurate answer (19,341 feet) almost as soon as the query is submitted.

Given the user's low tolerance for latency (delay in presenting an answer) and low tolerance for incorrect answers, systems that provide such answer services must be both fast and accurate. In fact, as of this writing, accuracy is so important that some search services have removed the functionality that presents answers at the top of a list of search results because of the bad reputation the search service had among users for providing incorrect answers.

Embodiments of the present disclosure are designed to provide both low latency and accuracy through a combination of technical features that solve the technical problem of providing accurate answers from a corpus of documents to a user query. These embodiments provide improvement to machines in both the combinations of technical features and in allowing the system to extract answers to queries from a corpus of documents, something that machines are traditionally not well-suited to perform.

Offline, search engines typically collect a corpus of documents which are parsed and data from and/or about the documents is stored in an index for fast and accurate retrieval. In embodiments of the present disclosure, documents in the corpus are also divided into document segments which are parsed and data from and/or about the segments is stored in a segment index. A "document segment" or more simply a "segment" as used herein means any portion of a document. A segment can be any length and contain any portion of a document. This can include portions of documents that are thought of as structured, such as a table, list, footnote, or portions thereof, as well as portions that are thought of as unstructured such as a section of text either in a complete form such as a paragraph, sentence, or in a partial form such as a portion of a paragraph, portion of a sentence, and so forth. The segment index allows fast and accurate retrieval of document segments that are relevant to a query.

A query is received from a user and a ranked list of document segments that are relevant to the query are retrieved from the segment index. A segment selector selects a subset (e.g., less than or all of the segments) of the segments based on a selection criteria. The selected subset along with the query is presented to a trained machine reading comprehension (MRC) model which receives the subset of segments and the query and returns a set of extracted answers to the query from the subset of segments. An MRC model is designed to take a query and to find an answer to the query, if it exists, in a corresponding document segment.

A subset of the extracted answers is selected based on a threshold. This subset is then clustered using a clustering method. The clustering method that is used will be dependent on the number of extracted answers in the subset. If a large number of extracted answers are used, clustering methods designed for use with larger numbers of items can be used, such as various machine learning techniques. If a small number of extracted answers are used, then methods more suited to smaller items can be used such as calculating edit distance between extracted answers and clustering based on edit distance.

The number of extracted answers in each cluster is examined and clusters with a number of extracted answers below a threshold are dropped from consideration. Based on the number of remaining clusters, an answer format is selected.

Some type of queries have a single correct answer. In the example above, "how tall is mount Kilimanjaro?" a single correct answer exists. However, for other types of queries, multiple answers may exist. Thus, the query of "what temperature should I cook a roast at?" may yield different answers that represent differences of opinion or different approaches to the question. These different types of answers may be presented differently in some embodiments of this disclosure.

The number of clusters remaining (after elimination of clusters with a number of answers below a threshold) identify which type of query has been submitted (one with a single answer or one with multiple answers). Thus, embodiments of the present disclosure may select an answer format based on the number of remaining clusters.

The remaining clusters have a number of answers that are above a threshold number. Each of these answers is associated with a document segment that was submitted to the trained MRC model. Due to the clustering, the answers of a given cluster are similar in some fashion. For each of the remaining clusters, an extracted answer is selected as the direct answer which will be presented to the user along with one or more supporting document segments where the answer or a similar answer can be found. In some embodiments more than one direct answer can be selected.

The direct answers and/or the supporting document segments are presented in the answer format that is determined based on the number of clusters. For example, where a single cluster exists, implying that a single correct answer exists, a direct answer can be drawn from the extracted answer in the cluster. The direct answer, along with the supporting document segment can be presented. The direct answer will also exist in the supporting document segment in context, so the document segment can be presented in such a way that the direct answer is formatted to draw the user's eye, such as by bolding, underlining, using a different color, highlighting, different font, and so forth. Additionally, if desired, references to additional supporting document segments where similar answers (e.g., answers from the same cluster) can be found can also be presented.

Where there are more than one cluster, there isn't a single correct answer, so the formatting of the answer can skip the area where the single correct direct answer is presented. In this situation, a direct answer from each of the clusters can be selected and the direct answer formatted in the document segment in a way to draw the user's eye (bold, underling, different font, different color, highlighting, and so forth). The formatted document segments (one for each cluster) can be presented so the user can see the different answers. Additionally, along with the selected supporting segment, segments where similar answers can be found can also be presented.

If the device is also able to return search results that are relevant to the query, the answer(s) can be presented along with the search results, such as at the top of the list of search results.

DESCRIPTION

FIG. 1 illustrates a representative system architecture 100 according to some aspects of the present disclosure. A user device 102 such as a mobile phone, laptop, tablet, wearable, desktop computer, automobile, and so forth, typically comprises a user interface 106 which can comprise a display, an input device such as a keyboard, touchscreen, microphone, and so forth. Using the user interface 106 a user can enter a query. As noted above, in this disclosure query will be used to encompass queries and questions. The query is submitted to a server-side service such as search service 104 via a client application such as a browser 108. Although in FIG. 1, a search service 104 is utilized as a representative example of a server-side service, the server-side service can also be a digital assistant, an answer service, or any other server-side service designed to help a user answer a query.

In the embodiment of FIG. 1, the search service 104 comprises a search engine 110, a search index 112, a segment index 114 and a question engine 116. Offline, an indexing process 120 pulls documents 118 from one or more document sources, such as websites on the internet, corporate storage locations, and so forth. The documents are parsed and information from and/or about the documents are stored in the search index 112. The search index allows the search engine 110 to quickly identify and rank documents that are relevant to a query. The indexing process 120 also divides the documents 118 into document segments and stores information about and/or from the document segment in the segment index 114.

When a query comes in, the search engine 110 utilizes the search index 112 to identify a ranked list of results that describe, among other things, where the associated document can be found as well as contextual information to allow the user to see what is in the associated document and how the document relates to the submitted query.

The search engine 110 and/or the question engine 116 utilize the segment index 114 to identify and rank a list of document segments that are relevant to the query. The question engine 116 utilizes the ranked list and, as explained in greater detail below, utilizes the segments to produce one or more direct answers to the submitted query. A format for the direct answer(s) is selected based on whether the query is of the type that there is one correct answer or whether the query is of the type that there are multiple correct answers.

The direct answer(s) can be returned in a format consistent with the server-side service. For example, for the search service 104, the direct answer(s) can be returned at the top of the list of returned search results.

Figure 2:
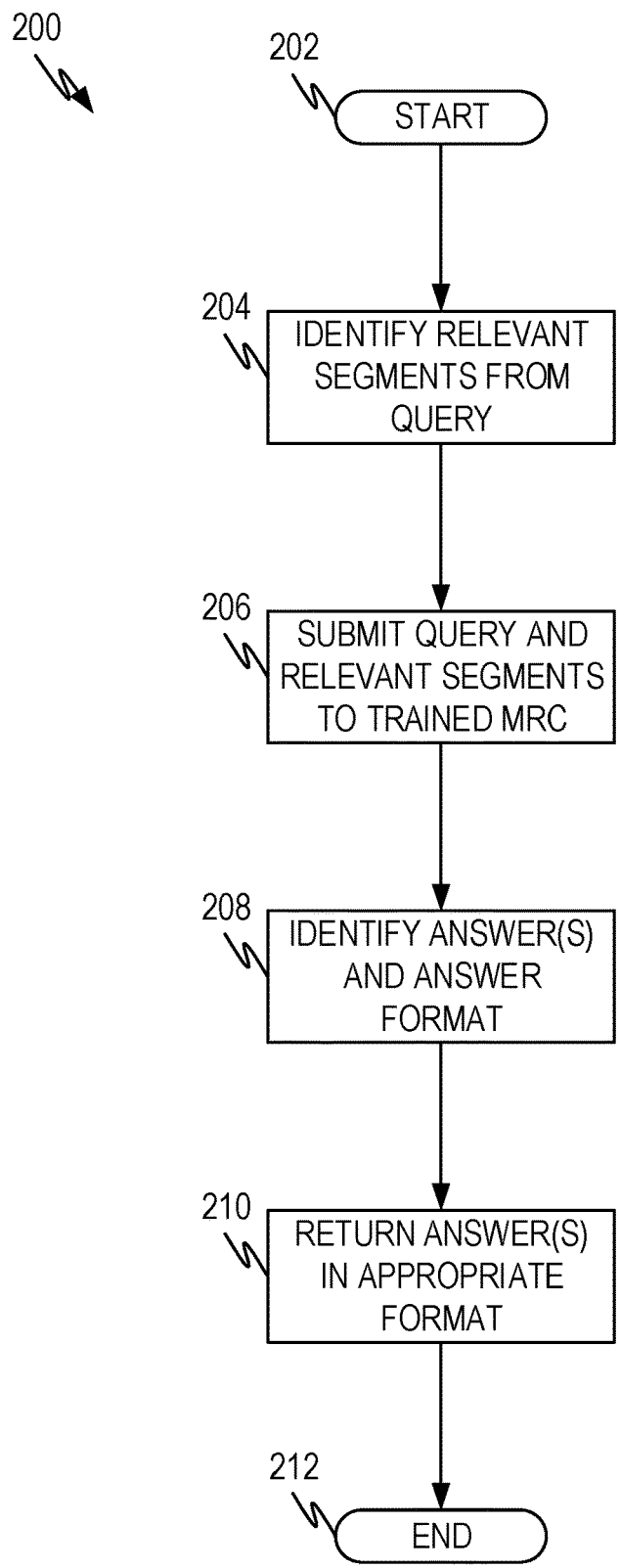
FIG. 2 illustrates a high level flow diagram according to some aspects of the present disclosure.

FIG. 2 illustrates a high level flow diagram 200 according to some aspects of the present disclosure. The flow diagram 200 illustrates at a high level how answers to a query are generated according to aspects of the present disclosure. It illustrates the major operations that are performed to generate answers to a query.

The flow diagram begins at operation 202 and proceeds to operation 204 where a ranked list of document segments relevant to the submitted query are generated. This operation is discussed in greater detail below. Furthermore, this operation may be performed by other aspects of a greater system in which the question engine 116 is embedded. For example, search services already have technical features which identify documents relevant to a query. The same technical features can be employed to produce a ranked list of segments based on the query. Additionally, or alternatively, the technical features that produce the ranked list of segments can be incorporated into the answer engine 116. Producing a ranked list of segments is discussed in greater detail below.

In operation 206 a subset of the ranked list is submitted to a trained machine reading comprehension (MRC) model. The MRC model has been trained to receive the query and a document segment and produce an extracted answer that is a continuous sub-span of the document segment. Multiple segments can be processed in parallel. The MRC model and its training are discussed in greater detail below.

Operation 208 utilizes the extracted answers produced by the MRC model in operation 206 and identifies the extracted answer(s) that will be displayed to the user and the format in which the answer(s) will be displayed. This is accomplished as described below by using clustering methods to cluster the extracted answers into clusters. The clusters each have similar answers or answers that are related. Each cluster, therefore, contains information from which a direct answer can be extracted. Clusters that fall below a threshold number of extracted answers can be eliminated from consideration in some embodiments.

The number of clusters identify the type of query that was submitted. As explained above, some queries have a single correct answer (e.g., length of a particular bridge), while other queries have multiple correct answers (e.g., how to tie a shoelace).

A direct answer is extracted from each cluster along with the document segment from which it was extracted (supporting document segment). Additionally, multiple other segments can be identified from the same cluster that have substantially the same answer. As noted below, these can be presented as additional support for the answer that was presented.

Operation 210 returns the direct answer(s) and supporting document segments along with any additional support source information and presents the direct answer(s) to the user in the appropriate format. In the context of this disclosure "source" means locator information for the document from which the segment is drawn. This can be a website where a document resides, a page on a website, a link to a document, and so forth. Formatting and returning the results can be accomplished by a server-side service, such as a search service. Additionally, or alternatively, the information can be merged with other information when presented to the user. For example, the answer information can be presented at the top of a list of search results.

The flow diagram ends at operation 212.

Figure 3:
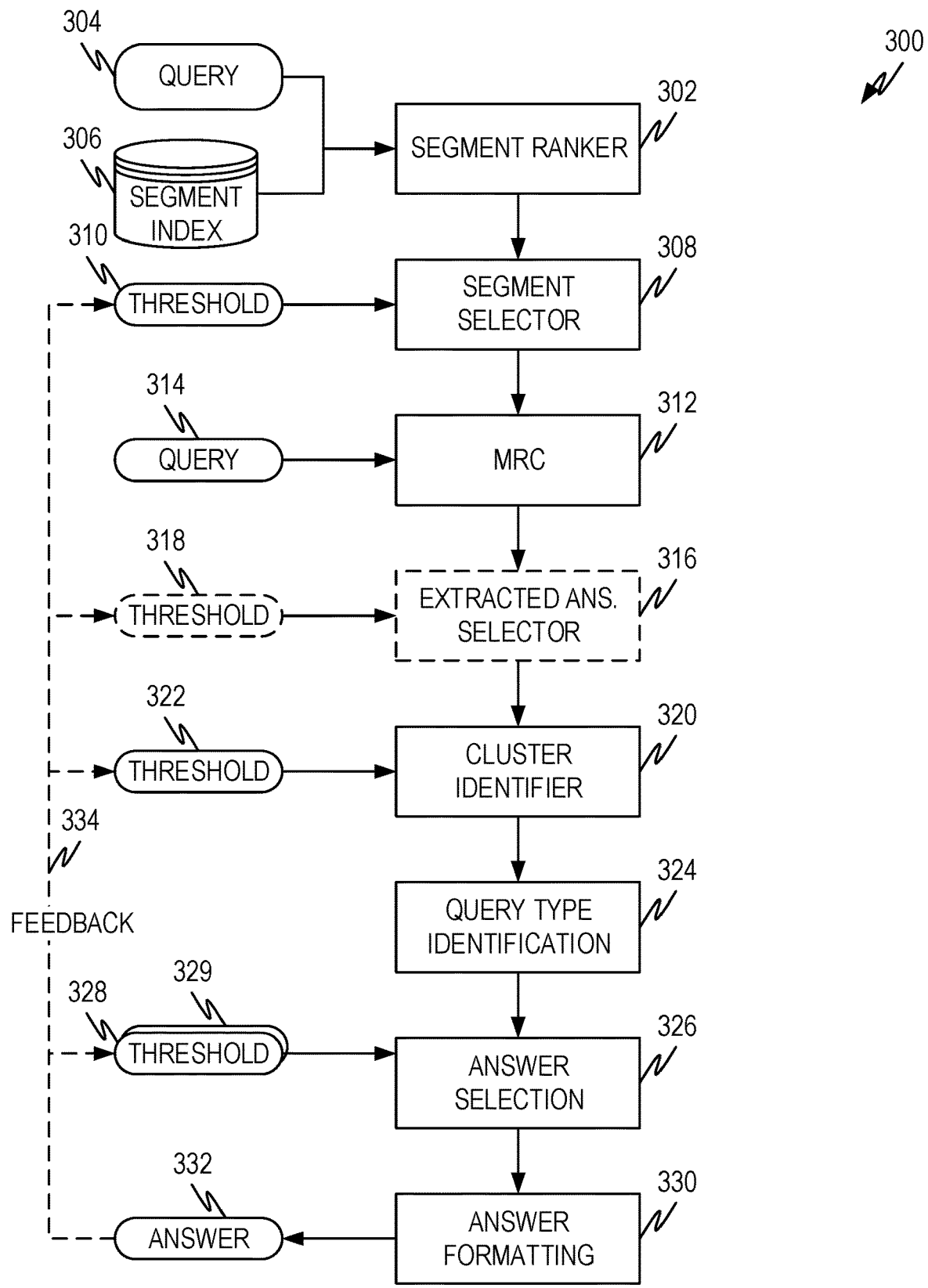
FIG. 3 illustrates another representative system architecture according to some aspects of the present disclosure.

FIG. 3 illustrates another representative system architecture 300 according to some aspects of the present disclosure. The architecture 300 explains in greater detail how the high-level operations of FIG. 2 can be implemented and accomplished.

As discussed above, users expect both accuracy and responsiveness in when a query is submitted and answers are provided. Thus, the architecture of FIG. 300 contains several adjustment points that can be made to tune the architecture to provide accuracy and responsiveness. Put another way, the architecture is not simply a collection of known elements, but is put together in such a way that elements can be tuned to achieve desired ends. That is not to say that each and every element of FIG. 3 are required in each and every embodiment.

The first high level operation is to identify segments relevant to the query. One implementation that has already been described is to utilize the same technical features as the search engine 110 if the question engine 116 is implemented in the context of a search service 104. In another aspect where the question engine 116 is implemented in the context of a search service 104, the search engine 110 can utilize the segment index and its technical features to produce a ranked list of segments in the same fashion that the search engine 110 finds relevant documents using the search index 112. For other embodiments where the question engine 116 is not implemented in the context of a search service 104 or where the question engine 116 is implemented in a context where the technical features of a search engine are not available, then similar technical features can be implemented in segment ranker 302.

Segment ranker 302 utilizes the submitted query 304 and the segment index 306, which can be produced in the same fashion as segment index 114. The purpose of segment ranker 302 is to identify segments relevant to the query and to rank them according to one or more criteria. Identifying and ranking the most relevant segments to a query can utilize a number of different technical features. The query is used to search the segment index to identify segments relevant to the query. Various strategies can be used to search the index and the particular strategy will often be dependent on how the index was built. The result are those segments that have some similarity to the query.

After the segments that have some similarity to the query are identified, the passages are ranked. Ranking applies one or more ranking criteria. The ranking criteria are typically based on extracted features that describe the amount or quality of similarity between the query and segment and/or that describe the quality of the segment itself. Examples can include how many terms in the query match the segment, how many terms in the segment multiplied by how many terms in the query match terms in the segment, what is the largest span of terms in the query that match the segment, the authority of the segment (quality and/or reliability of the segment), and so forth. The various features can be converted into a score so that thresholds and ordering can be applied and various levels. These can be layered so that features that are easily calculated can be used to select a subset of the segments, whereupon a more expensive (in terms of calculation) feature can be used to select a further subset of the segments and so forth. The result is a ranked list of the most relevant and/or authoritative segments.

The ranked list of segments is passed into the segment selector 308. The segment selector 308 applies a first threshold 310 to select only the top N segments from the ranked list for further processing. In some embodiments N is on the order 15 or fewer segments. In another embodiment, N is on the order of five or fewer segments. This threshold gates the number of segments that will be searched for answers by the MRC and thus not only limits how much processing is required to extract answers from the subset of segments selected by the segment selector 308 but also applies a "greater" or "looser" relevance/authoritativeness criteria. Because the list of segments from the segment ranker are ranked according to relevance and/or authoritativeness, although all items on the list are relevant based on the selection and ranking criteria, the farther down the list you go, the less relevant/authoritative the segments become.

The subset selected by segment selector 308 is passed to the trained MRC model 312. The details of a suitable MRC model are discussed below. As indicated herein, the purpose of the MRC is to look for an answer to the query 314 in a segment. Thus, the trained model receives the subset of segments and the query 314 and produces extracted answers, each of which is extracted from one of segments in the subset. Because MRC models 312 are built on the assumption that an answer to the query resides in the segment, it is important to ensure that only segments that are likely to include an answer to the query are submitted. Because of the segment ranker 302 and the segment selector 308, the subset of segments submitted to the trained MRC model 312 are very likely to include an answer.

Trained MRC models 312 tend to process the segments that are submitted one-by-one in a query-segment pair. Thus, when the subset submitted to the trained MRC model 312 contains multiple segments, the segments can be processed in parallel.

The extracted answers, along with the segments in which they are found are available out of the MRC. Since the segments were also ranked, a relative ranking for the extracted answers can also be identified by applying the ranking of the segment in which the answer is found to the extracted answer.

If desired, the number of extracted answers can be reduced by applying a threshold 318 to the number of extracted answers by extracted answer selector 316.

The extracted answers are then clustered by cluster identifier 320. The methodology applied by cluster identifier 320 to cluster the extracted answers can be dependent on the number of extracted answers. Certain methodologies tend to work better with different numbers of items. For example, machine learning methodologies tend to work better when there are more input items. While other methodologies tend to work better with fewer input items. In some embodiments the number of items to be clustered tends to be relatively small. The number of items that are available are set by the first threshold 314 and the second threshold 318 (if any). If, for example, threshold 310 is set at 15 and threshold 318 is not used, then there will be 15 items to be presented to cluster identifier 320.

When the number of items are relatively low, text based clustering can be used. For example, a combination of edit distance calculation, containment calculation, and so forth. Edit distance is the number of changes that need to be made to convert one text item into another. Edit distance is sometimes referred to as the Levenshtein distance and algorithms to calculate the edit distance are known in the art. Using edit distance, there are several distance-based clustering algorithms known in the art such as various hierarchical type clustering algorithms or point assessment type clustering algorithms that can be applied to cluster the answers into clusters.

Containment identifies whether one string is contained in the other. Containment and other such metrics can be used to modify a calculated edit distance prior to clustering in some embodiments. For example, if one string is contained within the other, then they can be taken as the same independent of the edit distance. This can be accomplished, for example, by setting the edit distance between them to zero. Other metrics can similarly be used to modify edit distance in some embodiments.

Once the clusters are identified, a threshold 322 can be applied in order to eliminate clusters that contain less than (or less than or equal to) the threshold 322 number of answers. This threshold 322 thus sets how much "accord" there must be in the extracted answers to consider the extracted answers as a valid candidate for a direct answer that will be returned to the user. Thus, the threshold sets a minimum number of sources that must have similar answers before it is considered as valid. In one embodiment the threshold 322 is set to five. In another embodiment, the threshold 322 is set to two.

The number of clusters that remain after clusters with too few members are eliminated determine what type of query has been submitted. As noted herein, some queries have a single correct answer while others have multiple correct answers. If a single cluster remains, the query is one with a single correct answer. If multiple clusters remain, the query is one with multiple correct answers. Operation 324 counts the number of clusters in order to identify the query type. As explained herein, the query type can be used to adjust how the direct answer(s) to the query are presented to a user.

Operation 326 takes one or more direct answers from the extracted answers in each of the remaining clusters. In one embodiment a single direct answer is taken from each cluster. In other embodiments, more than one direct answer is taken from each cluster. The number of direct answers that are extracted from each cluster can be a configurable parameter.

As noted above, the extracted answers that make up each cluster can have an associated rank taken from the rank of the associated segment from which the extracted answer was taken. The extracted answer with the highest rank in a cluster can be selected as the direct answer for that cluster. If multiple direct answers are to be selected, the top L extracted answers in a cluster can be selected as direct answers for that cluster.

In addition to a number of direct answers, the system can select multiple support sources (e.g., web site and/or document) for presentation to a user. A support source can be used to show additional support for an answer. The number of support sources (in addition to the direct answer) that are selected can be set by threshold 328. In one embodiment the threshold 328 is equal to one. Using this threshold as an example, suppose the query is "how tall was George Washington?". This query is one where a single correct answer exists. Suppose that the extracted answers in the cluster are: 1: 6'-2"; 2: 6 ft. and 2 in.; 3: 72 inches and the extracted answers come from segments in web site A, document B and source C, respectively. Suppose further that answers are ranked in the designated order above. Then if the direct answer is 6'-2", the second ranked answer from document B can be selected as the additional support. Thus, for a query where a single direct answer exists, the threshold 328 can identify how many additional support sources are drawn from the cluster. As shown below, the threshold 328 also sets how many additional support sources are shown with each displayed direct answer in a multi-answer query.

Where the query is the type that has multiple correct answers, the threshold 329 shown in FIG. 3 can identify how many answers should be presented. Suppose that three clusters exist with the following answers and relative ranks:

TABLE 1

Example Clusters

| Cluster | Extracted Answers | Rank |
|---------|-------------------|------|
| Cluster 1 | Answer A | 5 |
|  | Answer B | 1 |

TABLE 1-continued

Example Clusters

| Cluster | Extracted Answers | Rank |
|---|---|---|
| Cluster 2 | Answer C | 3 |
|  | Answer D | 8 |
|  | Answer E | 2 |
| Cluster 3 | Answer F | 7 |
|  | Answer G | 4 |
|  | Answer H | 6 |

If the threshold 328 (the threshold that identifies how many additional sources are selected to show accord) is set to one and if the threshold 329 (the threshold that sets how many of the multi-answer direct answers should be shown) is set to two and if the system is further configured to present one direct answer for each cluster, then the system will draw one direct answer for presentation from each cluster, present the direct answer from two clusters, and present one additional support source for each direct answer presented. The system can draw the highest ranked extracted answers as the direct answer for the cluster. For Cluster 1 the direct answer would be Answer B (rank 1), for Cluster 2 the direct answer would be Answer E (rank 2), for Cluster 3 the direct answer would be Answer G (rank 4). However, since only direct answers from two clusters are presented (threshold 329=2), only the direct answers from Cluster 1 and Cluster 2 are presented since they have the highest ranked direct answers. Furthermore, since threshold 328 is set to one, one additional source would be presented to show accord with the directed answer. For Cluster 1 that would be the source associated with Answer A since rank 5 Answer A is the next highest ranked answer in the cluster. For Cluster 2 that would be the source associated with Answer C since rank 3 Answer C is the next highest ranked answer in the cluster.

Once the direct answers and any support sources are selected, then operation 330 formats the answer according the selected answer format and causes display of the answer 332 to the user.

If the user is not satisfied with the accuracy of the displayed direct answer(s), the user may provide feedback 334 that can be used to set one or more the various thresholds 310, 318, 322, 328 and/or 329. As explained above, the thresholds set how many relevant segments are used to identify extracted answers as well as how many extracted answers are used for clustering, how many items should be in a cluster before it is used to identify a direct answer and how many support sources are shown.

Adjusting threshold 310 to a higher number, for example, will increases the extracted answers out of the MRC 312. In some embodiments, depending on the amount of parallel processing that is available in the MRC 312, it can also increase the processing time to get the extracted answers. Adjusting the threshold to a higher number can also increase the number of less relevant and/or less accurate answers, although whether this is true depends on how well the segment ranker 302 selects and ranks segments. The threshold 310 can be adjusted upward when more extracted answers are desired, either for clustering and/or because more answers are to be selected by thresholds 328 and/or 329. The threshold 310 can be adjusted downward if too many irrelevant or inaccurate answers are provided, if fewer answers are desired for clustering and/or because fewer answers are selected by thresholds 328 and/or 329.

If threshold 318 is used, then adjusting the threshold upward will allow more extracted answers to be used downstream. The reasons to adjust upward and downward are similar to threshold 310.

Threshold 322 sets how much accord must exist before a cluster will be considered for a direct answer. This threshold allows for spurious answers to be eliminated from consideration. Although the threshold is typically not large, it can be set as a percentage or in relation to the total number of extracted answers that are used. Adjusting it upward can increase the certainty that an answer is accurate. However, setting it too high can result in accurate answers being suppressed. Thus, the adjustment upward and downward can be based on feedback on the accuracy and/or suitability of the answers.

Threshold 328 sets how many additional sources are selected to show accord and threshold 329 sets how many of the multi-answer direct answers should be shown. Threshold 329 can be set based on how much of a display is to be taken up by answers. For example, for smaller screen devices such as a mobile phone, the threshold can be decreased and for larger screen devices, the threshold can be increased. Additionally, the threshold can be adjusted upward and/or downward based on user preferences that set how many multi-answers a user wants to see. In the case of a multi-answer query, at least two answers are typically displayed or an answer with an indication that more than one answer exists along with a way for the user to access the additional answers (a "show more" button or similar).

Threshold 328 can also be based on screen size, user preferences, or a number that gives a user confidence that the answer is also found in multiple sources.

Feedback can be explicit or implicit. Explicit feedback can be collected, for example, by presenting user interface elements that allows the user to comment on the accuracy of the answer, the number of answers presented, the number of support sources, and so forth. The feedback can be used to tune the thresholds on a per user basis, per user cohort basis, collectively for all users, or combinations thereof. In other words, for users that want individual personalization, a user profile or other such mechanism can store what thresholds a user prefers. A user cohort is a collection of uses that have one or more things in common. Feedback across a user cohort can be aggregated so that thresholds can be set on a user cohort basis. Finally, the feedback for all users can be aggregated so that thresholds are set for all users.

Figure 4:
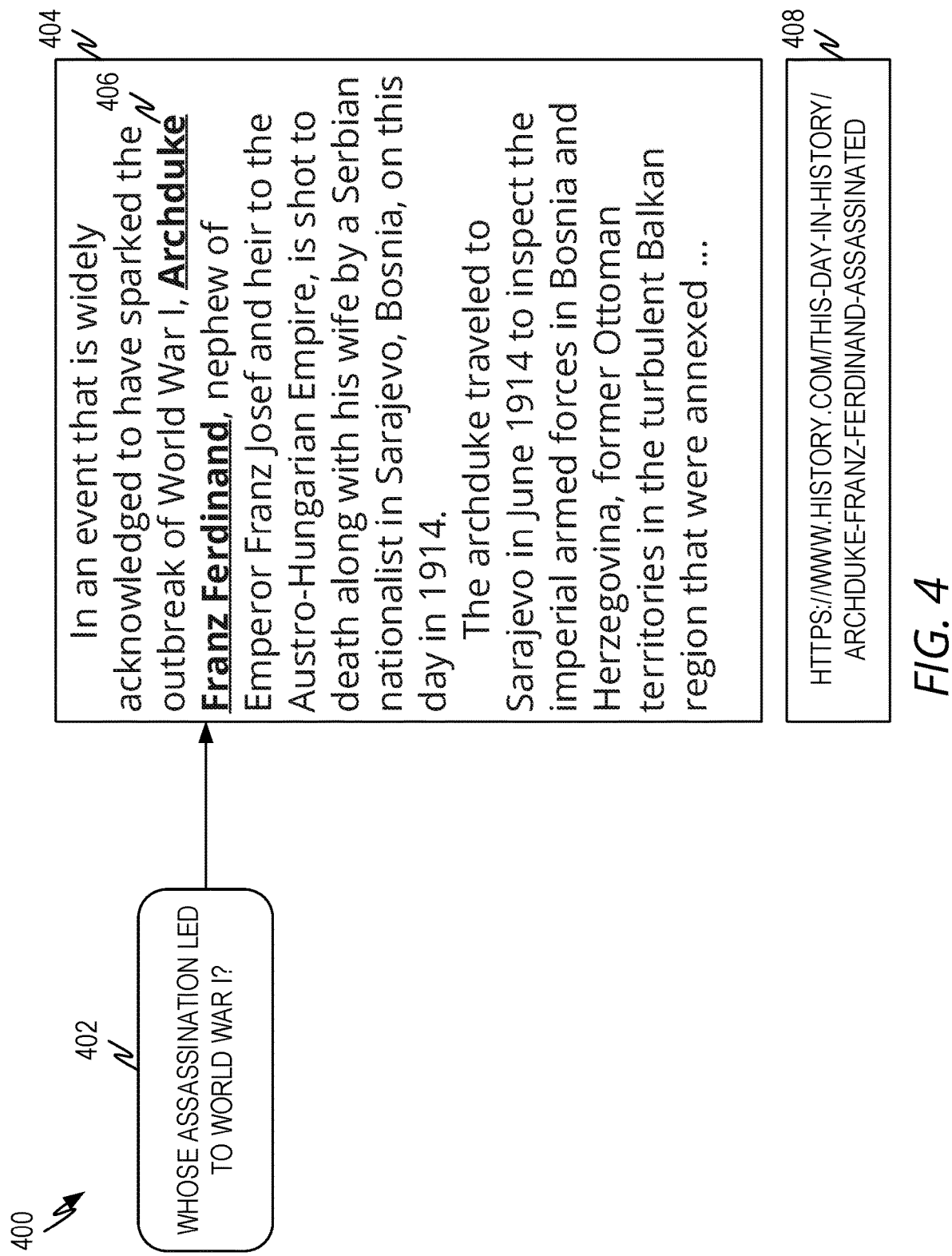
FIG. 4 illustrates a representative illustration of the goal of a trained machine reading comprehension model according to some aspects of the present disclosure.

FIG. 4 illustrates a representative illustration 400 of the goal of a trained MRC model according to some aspects of the present disclosure. Given a query 402 such as "Whose assassination led to World War I?" and a document segment 404 from a document 408, the trained MRC locates the phrase 406 in the document segment 404 that gives the answer to the query. In this case "Archduke Franz Ferdinand."

Figure 5:
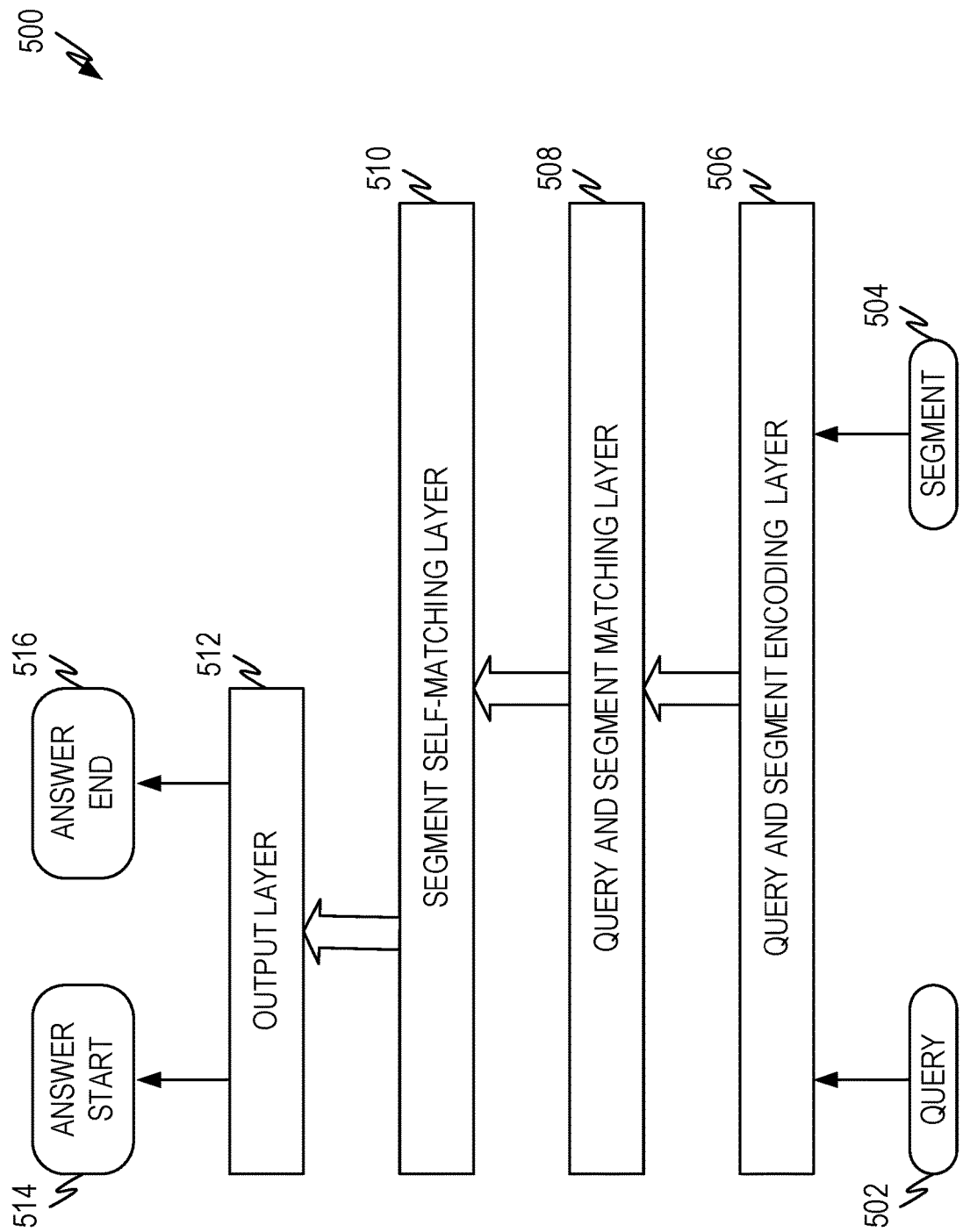
FIG. 5 illustrates a representative architecture for a machine reading comprehension model according to some aspects of the present disclosure.

There are several MRC methods that are suitable for use in the present disclosure. FIG. 5 illustrates a representative architecture 500 for an MRC model according to some aspects of the present disclosure. The model takes a query 502 and a document segment 504 and locates the start of the answer phrase 514 and the end of the answer phrase 516 in the document segment 504.

The query 502 is represented by $Q=\{w_t^Q\}_{t=1}^m$ and a segment 504 $S=\{w_t^S\}_{t=1}^n$. The words of the query 502 and the segment 504 are first converted to their respective word-level embeddings ($\{e_t^Q\}_{t=1}^m$ and $\{e_t^Q\}_{t=1}^m$) and character-level embeddings ($\{c_t^Q\}_{t=1}^m$ and $\{c_t^Q\}_{t=1}^m$). The character-level embeddings are generated by taking the hidden states of a bi-directional recurrent neural network (RNN) applied to embeddings of characters in the token in the query and segment encoding layer 506. Such character-level embeddings have been shown to be helpful to deal with out-of-vocabulary (OOV) tokens. A bi-directional RNN is used to produce new representation $u_1^Q, \ldots, u_m^Q$ and $u_1^S, \ldots, u_n^S$ of all words in the query and the segment respectively:

$$u_t^Q = \text{BiRNN}_Q(u_{t-1}^Q, [e_t^Q, c_t^Q]) \quad (1)$$

$$u_t^S = \text{BiRNN}_S(u_{t-1}^S, [e_t^S, c_t^S]) \quad (2)$$

The Gated Recurrent Unit (GRU) as described in "Kyunghyun Cho, Bart van Merrienboer, C,aglar G"ulc,ehre, Dzmitry Bandanau, Fethi Bougares, Holger Schwenk, and Yoshua Bengio. 2014. *Learning phrase representations using RNN encoder-decoder for statistical machine translation*, In Proceedings of the 2014 Conference on Empirical Methods in Natural Language Processing, EMNLP 2014, Oct. 25-29, 2014, Doha, Qatar, A meeting of SIGDAT, a Special Interest Group of the ACL. pages 1724-1734" can be used. This reference defines a type of hidden activation function that is similar to that used in LSTM machine learning models, but that may be simpler to compute and implement. The hidden activation function includes a reset gate, so that the previous hidden state can be ignored. When computing the activation of the $j^{th}$ hidden unit, the reset gate $r_1$ is computed by:

$$r_j = \sigma([W_r x]_j + [U_r h_{t-1}]_j) \quad (3)$$

Where $\sigma$ is the logistic sigmoid function and $[\bullet]_j$ denotes the $j^{th}$ element of a vector. x and $h_{t-1}$ are the input and previous hidden state, respectively. $W_r$ and $U_r$ are weight matrices which are learned.

The update gate $z_j$ is computed by:

$$z_j = \sigma([W_z x]_j + [U_z h_{t-1}]_j) \quad (4)$$

Where mutatis mutandis the elements are defined as above. The actual activation of the proposed unit $h_j$ is computed by:

$$h_j^t = z_j h_j^{t-1} + (1 - z_j) \tilde{h}_j^t \quad (5)$$

Where $$\tilde{h}_j^t = \phi([Wx]_j + [U(r \odot h_{t-1})]_j) \quad (6)$$

In this formulation, when the reset gate is close to 0, the hidden state is forced to ignore the previous hidden state and reset with the current input only. This effectively allows the hidden state to drop any information that is found to be irrelevant later in the future, thus allowing a more compact representation.

On the other hand, the update gate controls how much information from the previous hidden state will carry over to the current hidden state. This acts similarly to the memory cell in a LSTM neural network and helps the RNN to remember long-term information.

The query and segment matching layer 508 is implemented as an attention-based recurrent network. This layer is used to incorporate query information into segment representation. This is a variant of attention-based recurrent networks, with an additional gate to determine the importance of information in the segment regarding a query. Given query and segment representations, $\{u_t^Q\}_{t=1}^m$ and $\{u_t^S\}_{t=1}^n$, a sentence-pair representation $\{v_t^S\}_{t=1}^n$ is generated via soft-alignment of words in the query and segment as follows:

$$v_t^S = \text{RNN}(v_{t-1}^S, c_t) \quad (7)$$

Where $c_t = \text{att}(u^Q, [u_t^S, v_{t-1}^S])$ is an attention-pooling vector of the whole question ($u^Q$):

$$s_j^t = v^T \tanh(W_u^Q u_j^Q + W_u^S u_t^S + W_v^S v_{t-1}^S) \quad (8)$$

$$a_i^t = \frac{\exp(s_i^t)}{\sum_{j=1}^m \exp(s_j^t)}$$

$$c_t = \sum_{i=1}^m a_i^t u_i^Q$$

Each segment representation $v_t^S$ dynamically incorporates aggregated matching information from the whole query. A matching LSTM, which takes $u_t^S$ as an additional input into the recurrent network is given by:

$$v_t^S = \text{RNN}(v_{t-1}^S, [u_t^S, c_t]) \quad (9)$$

To determine the importance of segment parts and attend to the ones that are relevant to the question, another gate is added to the input $[u_t^S, c_t]$ of the RNN:

$$g_t = \sigma(W_g[u_t^P, c_t])$$

$$[u_t^P, c_t]^* = g_t \odot [u_t^P, c_t] \quad (10)$$

Where $\sigma$ is the logistic sigmoid function. Different from the gates in LSTM or GRU, the additional gate is based on the current segment word and its attention-pooling vector of the query, which focuses on the relation between the query and the current segment word. The gate effectively models the phenomenon that only parts of the passage are relevant to the query in reading comprehension and query answering. $[u_t^P, c_t]^*$ is used instead of $[u_t^P, c_t]$. This is called gated attention-based recurrent networks. It can be applied to variants of RNN, such as GRU and LSTM.

Through gated attention-based recurrent networks, the question aware segment representation $\{v_t^S\}_{t=1}^n$ is generated to pinpoint important parts of the segment in query and segment matching layer 508. One problem with such a representation is that it has limited knowledge of context. To address this problem, the segment self-matching layer matches the query-aware segment representation against itself. It dynamically collects evidence from the whole segment for words in the segment and encodes the evidence relevant to the current segment word and its matching question information into the segment representation $h_t^S$:

$$h_t^S = \text{BiRNN}_Q(h_{t-1}^S, [v_t^S, c_t]) \quad (11)$$

Where $c_t = \text{att}(v^S, v_t^S)$ is an attention-pooling vector of the whole passage ($v^S$):

$$s_j^t = v^T \tanh(W_v^S v_j^S + W_v^{\tilde{S}} v_t^S) \quad (12)$$

$$a_i^t = \frac{\exp(s_i^t)}{\sum_{j=1}^n \exp(s_j^t)}$$

$$c_t = \sum_{i=1}^n a_i^t v_i^S$$

An additional gate as in the gated attention-based recurrent networks above is applied to $[v_t^S, c_t]$ to adaptively control the input of the RNN.

Self-matching extracts evidence from the whole segment according to the current segment word and query information.

The output layer 512 uses pointer networks to predict the start position 514 and end position 516 of the answer. In addition, an attention-pooling over the query representation to generate the initial hidden vector for the pointer network is used. Given the segment representation $\{h_t^S\}_{t=1}^n$, the attention mechanism is utilized as a pointer to select the start position, $p^1$, and the end position, $p^2$, from the segment, which is formulated as:

$$s_j^t = v^T \tanh(W_h^S h_j^S + W_h^a h_{t-1}^a) \quad (13)$$

$$a_i^t = \frac{\exp(s_i^t)}{\sum_{j=1}^n \exp(s_j^t)}$$

$$p^t = \arg\max(a_1^t, \ldots, a_n^t)$$

Here $h_{t-1}^a$ represents the last hidden state of the answer recurrent network (pointer network). The input of the answer recurrent network is the attention-pooling vector based on current predicted probability of $a^t$:

$$c_t = \Sigma_{i=1}^n a_i^t h_i^S$$

$$h_t^a = RNN(h_{t-1}^a, c_t) \quad (14)$$

When predicting the start position, $h_{t-1}^a$ represents the initial hidden state of the answer recurrent network. The query vector $r^Q$ is sued as the initial state of the answer recurrent network. $r^Q = \text{att}(u^Q, V_r^Q)$ is an attention-pooling vector of the query based on the parameter $V_r^Q$:

$$s_j = v^T \tanh(W_u^Q u_j^Q + W_v^Q V_r^Q) \quad (15)$$

$$a_i = \frac{\exp(s_i)}{\sum_{j=1}^m \exp(s_j)}$$

$$r^Q = \sum_{i=1}^m a_i u_i^Q$$

To train the network, the sum of the negative log probabilities of ground truth start and end positions are minimized by the predicted distributions.

Figure 6:
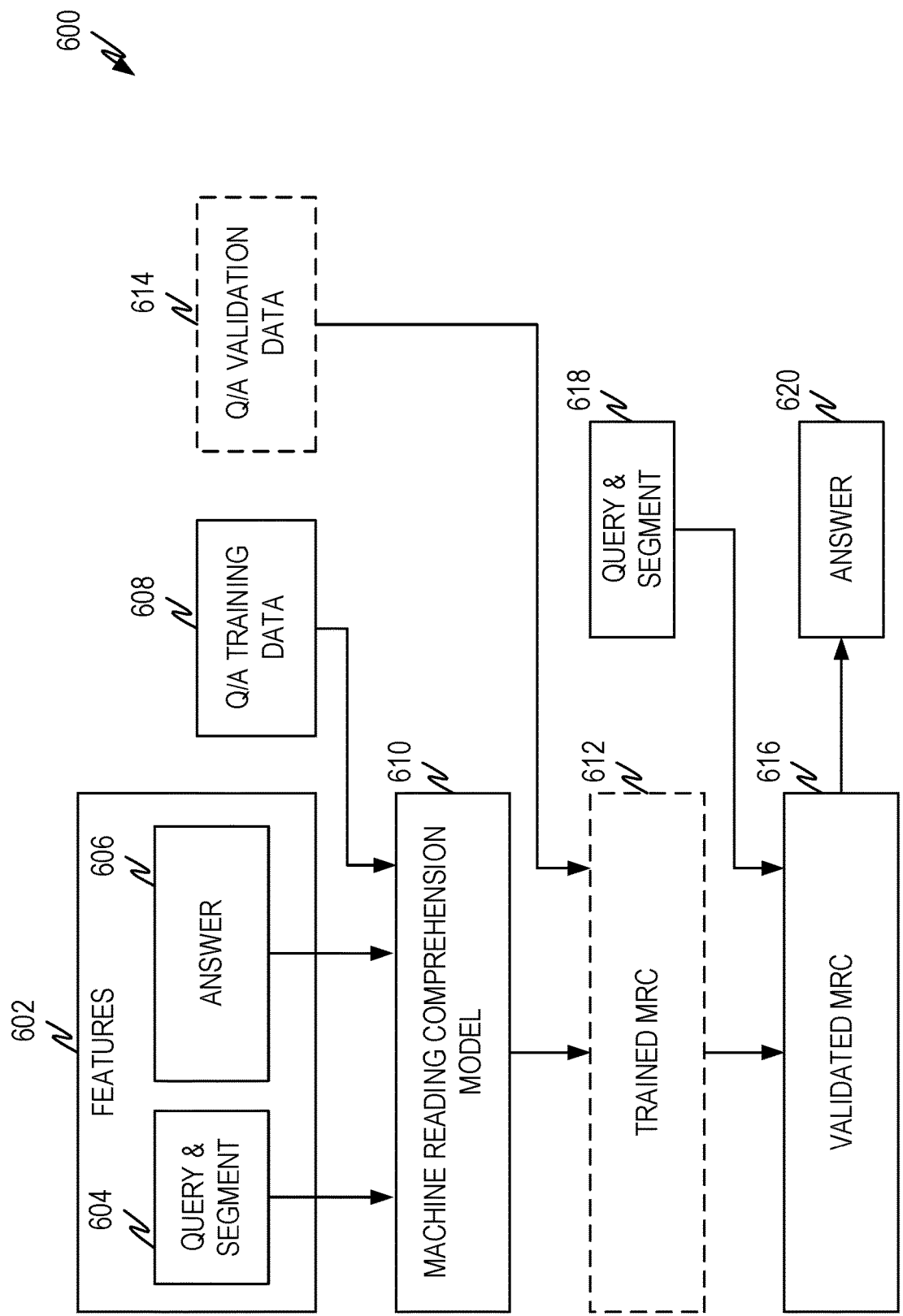
FIG. 6 illustrates a representative training methodology for a machine reading comprehension model according to some aspects of the present disclosure.

FIG. 6 illustrates a representative training methodology 600 for a machine reading comprehension model according to some aspects of the present disclosure. As discussed herein, MRC models rely on machine learning. Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model 612 from example training data 608 in order to make data-driven predictions or decisions expressed as outputs or assessments 1120. For MRC the output is the answer that is found in the corresponding segement. Although example embodiments are presented as using the disclosed MRC model, other embodiments may utilize different machine learning models.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide the mapping from the query-passage pair to the answer. The machine-learning algorithms utilize the training data 608 to find correlations among identified features 602 that affect the mapping from the query-passage pair to the answer. In one example, the features 602 may be the query-segment pair 604 which is mapped to the answer 606.

With the training data 608 and the identified features 602, the MRC model 612 is trained at operation 610. The MRC model appraises the value of the features 602 as they correlate to the training data 608. The result of the training is the trained MRC model 612. Training data for MRC is difficult to assemble since a human needs to look at a query and a segment and identify which phrase in the segment correctly answers the query. Crowd sourcing can be used to assemble the necessary training data. Additionally, or alternatively, two publicly available data sets exist and can be used for the training data 608 and/or validation data 614 (discussed below). One is the Microsoft Machine Reading Comprehension Dataset available at http://www.msmarco.org. Another is the Stanford Question Answering Dataset (SQuAD) available at https://rajpurkar.github.io/SQuAD-explorer/.

After the trained MRC model 612 is produced, a validation operation may be performed in some instances. Validation involves taking a set of annotated data 614 and using the trained MRC model 612 to produce an output for each of the data points in the validation data set 614. The output for the set is compared to the annotations which describe what should have been output from the MRC model 612. Statistics can be evaluated to see how well the trained MRC model 612 operates and, if the accuracy is acceptable, the trained MRC model 612 can be validated 616. Otherwise, additional training can be performed.

When the MRC model 612 or 616 is used to perform an assessment, new data 618 in the form of a query-segment pair is provided as an input to the trained MRC model 616, and the MRC model 616 generates the assessment such as answer 620 as output.

Figure 7:
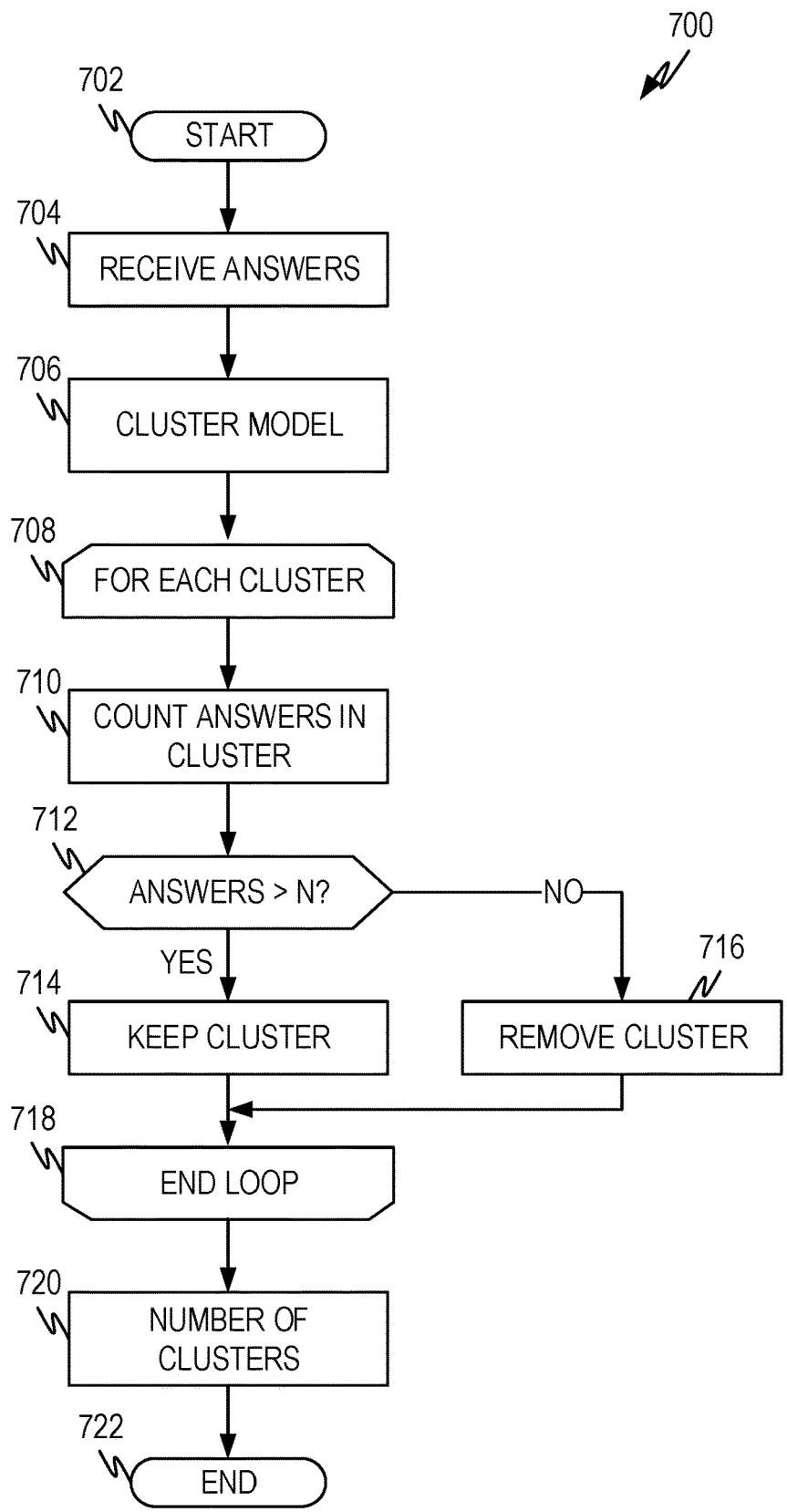
FIG. 7 illustrates a representative flow diagram for clustering extracted answers according to some aspects of the present disclosure.

FIG. 7 illustrates a representative flow diagram 700 for clustering extracted answers according to some aspects of the present disclosure. This flow diagram describes how, for example, the cluster identifier 320 can be implemented in some embodiments. The flow diagram begins at operation 720 and proceeds to operation 704 where the extracted answers from the MRC are accessed. The extracted answers are then clustered in operation 706 using an appropriate clustering model. As described above, for the few extracted answers of a typical embodiment, clustering based on edit distance and/or other text-based clustering methodologies are suitable. Additionally, or alternatively, a machine-learning based clustering methodology can also be used.

Once the extracted answers have been clustered into different clusters, the loop beginning at operation 708 and ending at 718 loops over all the clusters eliminating those with a number of extracted answers below a given threshold (e.g., threshold 322).

In operation 710 the number of extracted answers in a cluster are counted. In operation 712 that number is compared to a threshold N, which is equivalent to threshold 322 of FIG. 3. If the number of extracted answers is below the threshold (or less than or equal to in some embodiments), then the cluster is eliminated in operation 716. Otherwise, if the number of extracted answers is greater than the threshold (or greater than or equal to in some embodiments), the cluster is kept. The next cluster is then examined per operation 718 until all clusters have been examined.

One the loop is finished, the number of clusters that remain 720 have been identified. As noted elsewhere, this number is used to identify a suitable format for presenting the answers. This is equivalent to ascertaining whether the query is a single-answer type query or a multi-answer type query.

The method ends at operation 722.

Figure 8:
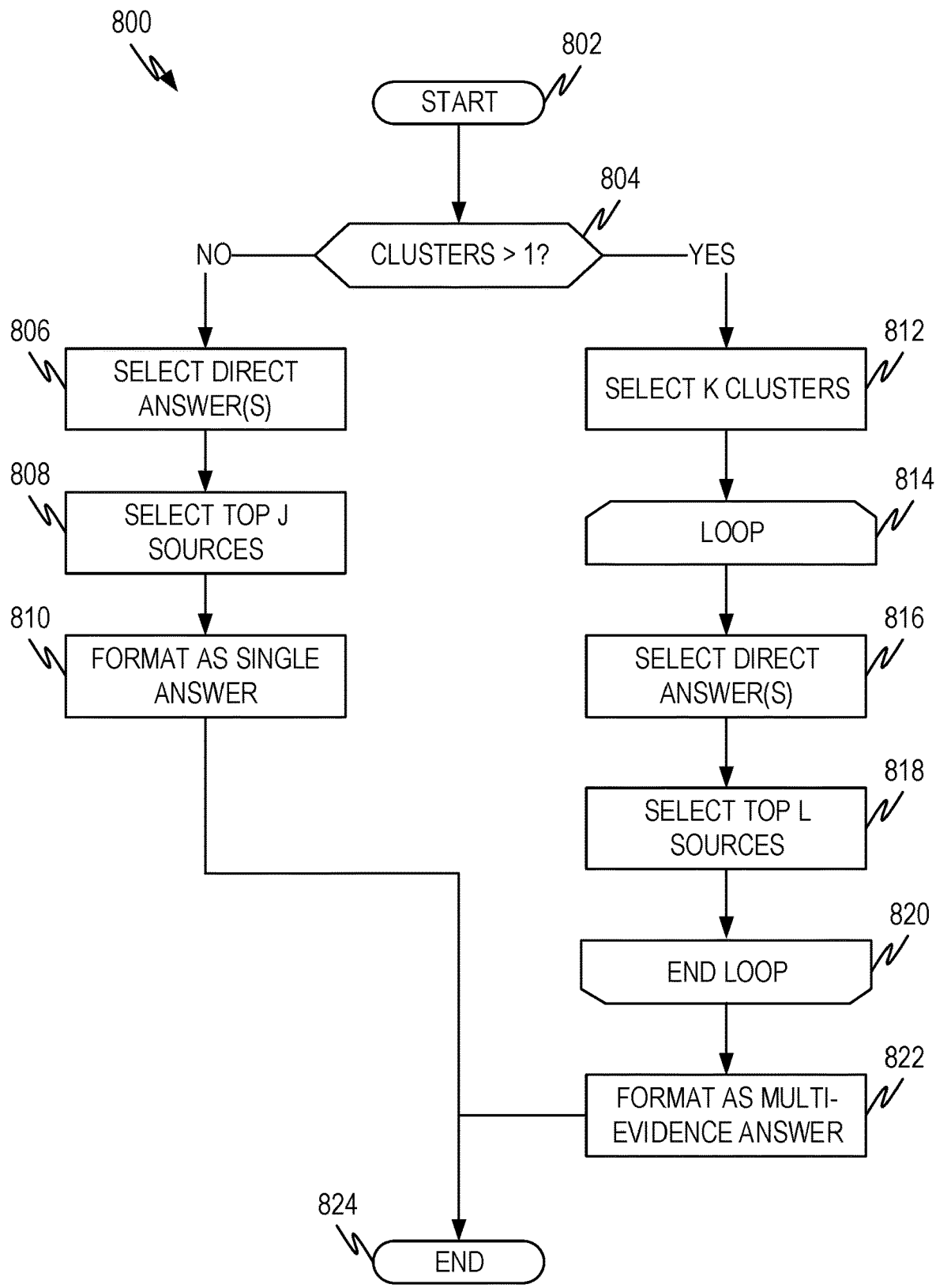
FIG. 8 illustrates a representative flow diagram showing selection of an answer and answer format according to some aspects of the present disclosure.

FIG. 8 illustrates a representative flow diagram 800 showing selection of an answer and answer format according to some aspects of the present disclosure. This diagram illustrates, for example, how the query type identification 324 and answer selection 326 can be implemented in some embodiments.

The method begins at operation 802 and proceeds to operation 804 where the number of clusters are identified. The number of remaining clusters (after eliminating those with too few extracted answers as previously explained) determine whether the query has a single answer or multiple answers. Thus, operation 804 tests whether there are more than one cluster. If not, then the query has a single answer and the method proceeds to operation 806.

One condition not explicitly illustrated in FIG. 8 and not explicitly discussed above, is the degenerate situation where no clusters had a sufficient number of extracted answers to avoid elimination. In that situation, there is insufficient accord in any cluster to have confidence that a direct answer exists. In that case, the system can either inform the user that no answer was found, that insufficient information exists, not return an answer, and/or take other actions consistent with no answers.

One of those other actions can be to examine the threshold 322 and/or N of FIG. 7 to see if the threshold is set too high. This may occur, for example, if the threshold 322 and/or N is set to too great of percentage of the number of extracted answers available for clustering. Thus, in some embodiments, a limit can be set on the threshold 322 and/or N so that it never goes above a certain percentage of the number of extracted answers available for clustering. If the threshold is set too high, the threshold can be lowered, and the clusters examined again to see if sufficient accord exists.

In operation 806 the appropriate number of direct answers are extracted from the cluster. As discussed above this can be a configurable parameter and is often set to one in many embodiments. The direct answer is selected as the top ranking answer in the cluster.

Operation 808 selects the top J supporting sources from the remaining extracted answers in the cluster. In some embodiments, J is the threshold 328 discussed above.

In operation 810, the selected direct answer(s), the associated segment(s) and the supporting sources are formatted as a single answer. Formatting is discussed in greater detail in FIG. 9 below.

The method ends at operation 824.

If more than one cluster exists, then the query has multiple correct answers and the method proceeds from operation 804 to operation 812. Operation 812 selects how many of the multiple answers will be displayed by selecting the top K clusters. K can be set by threshold 329. As discussed above, the rank of a cluster can be the rank of its highest ranking extracted answer. In the example clusters of Table 1, Cluster 1 would have a relative rank of 1, Cluster 2 would have a relative rank of 2, and Cluster 3 would have a relative rank of 4, these ranks being the highest ranking extracted answer in the cluster.

The loop that beings at operation 814 and ends at operation 820 is over the top K clusters. The appropriate number of direct answers are identified from the cluster. As noted, the number of direct answers used from each cluster is a configurable parameter and is often set to one. The highest ranking extracted answer(s) are selected as the direct answer(s).

Operation 818 selects the top L supporting sources. L can be the same as J or can be different. L is same as threshold 328 in some embodiments.

Once the direct answers and supporting sources are extracted from all K clusters, operation 822 formats the information as a multi-evidence answer and the method ends at operation 824. Formatting is discussed in greater detail in FIG. 10 below.

Figure 9:
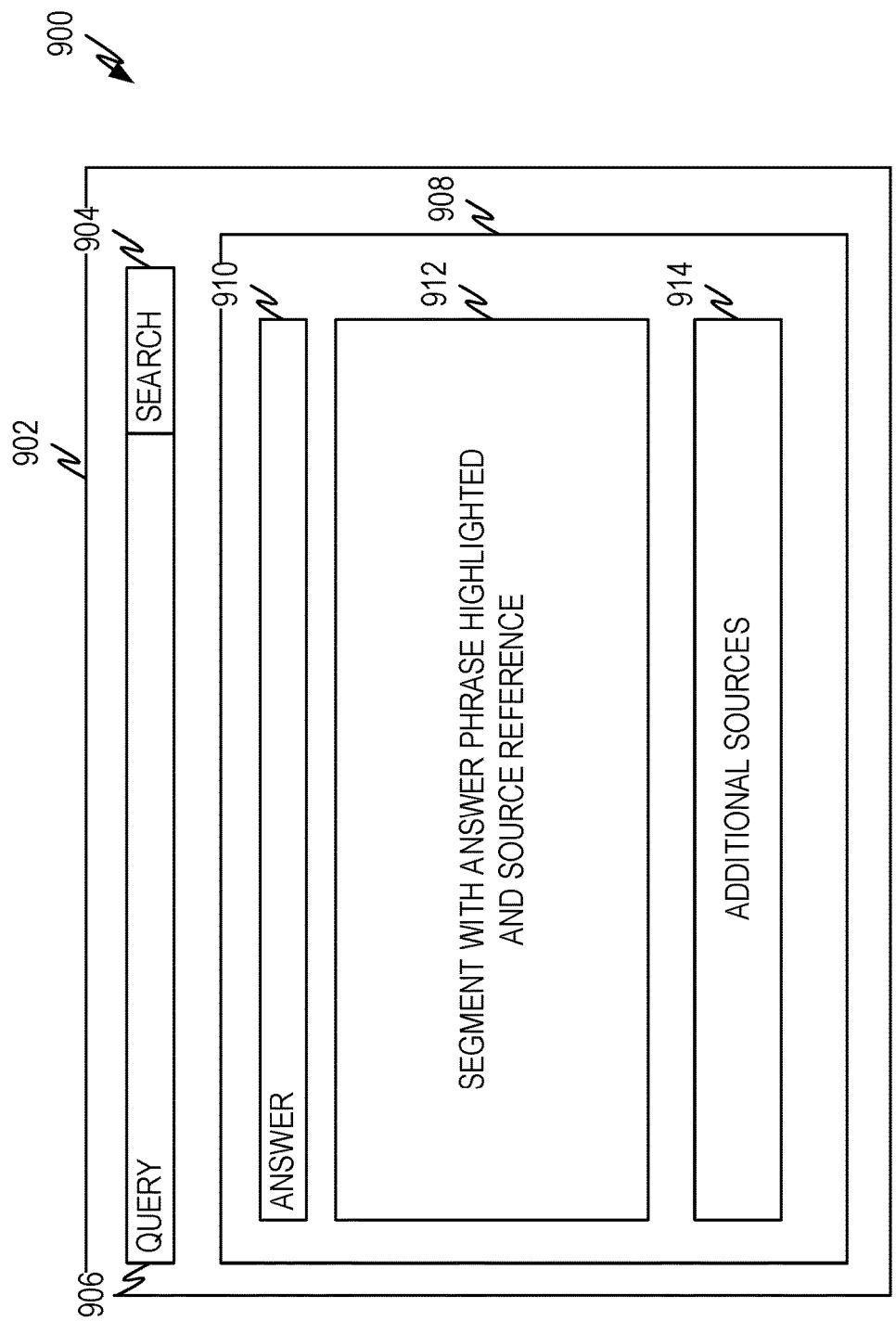
FIG. 9 illustrates a representative user interface according to some aspects of the present disclosure.

FIG. 9 illustrates a representative user interface 900 according to some aspects of the present disclosure. This figure illustrates one representative example of how the answer to a single answer query can be displayed.

The user interface 900 comprises a display area 902 where the information is displayed. The user interface can comprise an area 906 where a query can be entered and a button/control 904 that causes submission of the query.

The display area 902 comprises a region 908 where the single-answer information is displayed. In a single-answer type query, there is one correct answer that corresponds to the direct answer selected as indicated above. The region 908 can comprise an area 910 where the direct answer is displayed. If multiple direct answers are selected, then multiple direct answers can be displayed.

In some embodiments, the direct answer 910 can be the only thing displayed, along with such other information to allow the user to discern that this is the answer to their question. In other embodiments, the region 908 can comprise an area 912 where the context surrounding the direct answer 910 can be displayed. This area 912 contains some or all of the segment from which the direct answer 910 was drawn with the direct answer highlighted and the source where the segment can be located. For example, in FIG. 4, the query submitted was "whose assassination led to World War I?". The illustrated segment 404 has the direct answer highlighted 406. In the user interface of FIG. 9, the answer area 910 can comprise the direct answer "Archduke Franz Ferdinand." Area 912 can comprise the segment 404 with the answer 406 highlighted in some fashion so as to draw the user's eye.

Highlighting to draw the user's eye can comprise bolding, underlining, italics, using a different font, using a different color, highlighting (e.g., apply a color highlighting to the text), and/or combinations thereof. Any type of formatting designed to draw the user's eye and allow the user to pick out the answer in the context of the segment can be used.

In addition, the area 912 can comprise information to locate the segment and/or the document from which the segment was drawn. Thus, area 912 can also comprise locating information 408.

Region 908 can also comprise an area 914 that allows a user to identify and locate additional sources where similar answers can be found. These are the additional and/or support sources described previously.

In addition, the answer information in region 908 can be displayed as part of other information. For example, at the beginning of a list of search results.

Each of the areas can comprise information to allow the user to identify what the information in the area is describing (an answer, supporting sources, and so forth).

Figure 10:
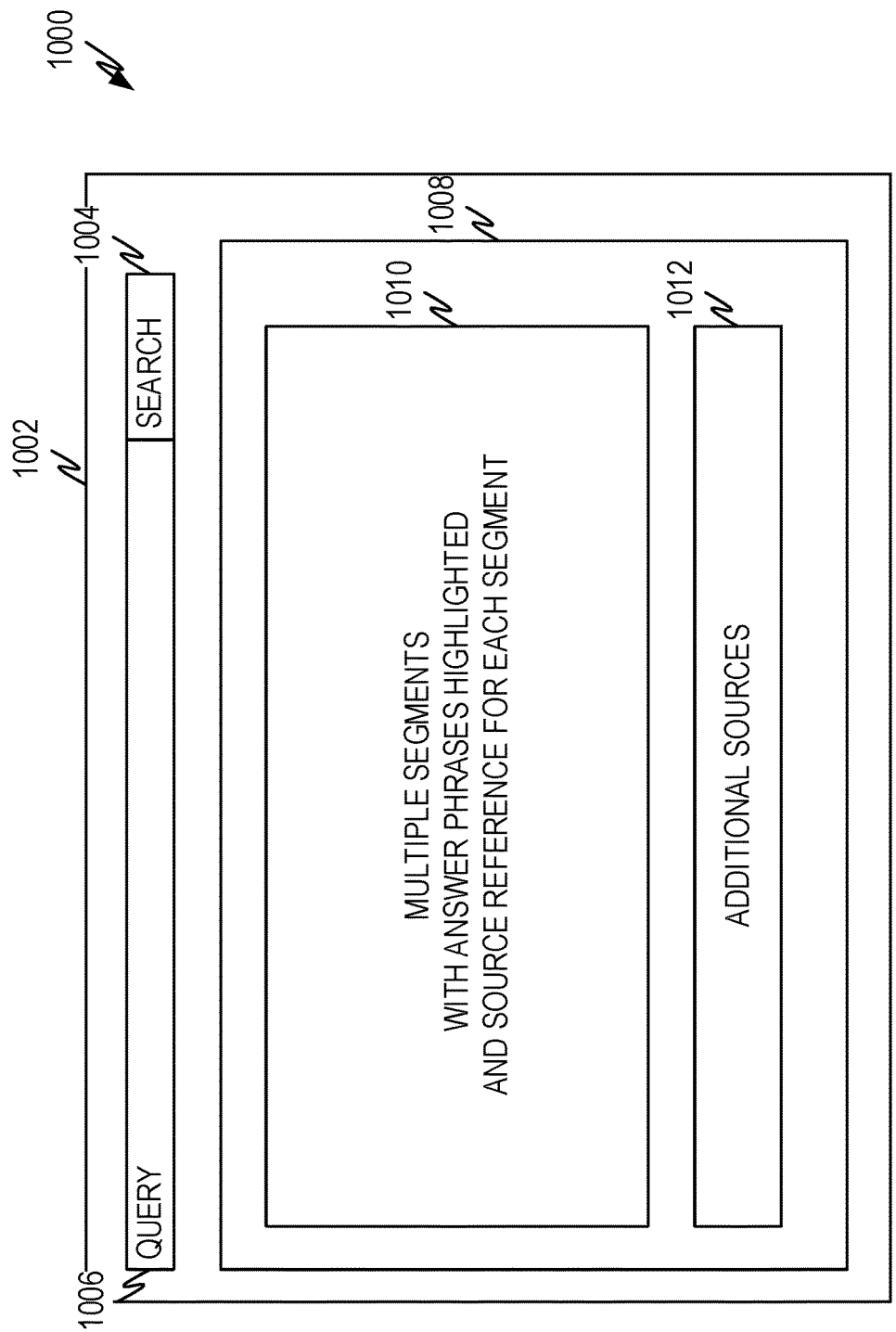
FIG. 10 illustrates a representative user interface according to some aspects of the present disclosure.

FIG. 10 illustrates a representative user interface 1000 according to some aspects of the present disclosure. This figure illustrates one representative example of how the answer to a multi-answer query can be displayed.

The user interface 1000 comprises a display area 1002 where the information is displayed. The user interface can comprise an area 1006 where a query can be entered and a button/control 1004 that causes submission of the query.

The display area 1002 comprises a region 1008 where the multi-answer information is displayed. In a multi-answer type query, there are multiple direct answers as previously indicated. The region 1008 can comprise an area 1010 where the direct answer is displayed. The number of direct answers that are displayed is set by a threshold as previously discussed. In the alternative, less than the threshold number of direct answers can be displayed along with a button/control that allows more of the direct answers to be revealed and/or displayed.

One way to present direct answers for a multiple answer query is to present the direct answers in the context of a segment with the direct answer highlighted. For example, if the query is "what temperature should my deep fryer be set on for fried potatoes?" multiple segments may be retrieved, each having an appropriate direct answer. If one segment states the temperature should be 275 degrees F. and another 370 degrees F., the two segments can be presented with the answers highlighted along with the locating information. For example:

Soak potatoes in a large bowl of water for about 30 minutes. Pat dry thoroughly with paper towels. Heat oil in a deep-fryer or a large saucepan to 275 degrees F. (135 degrees C.). Gently add the potatoes in the hot oil for about 5 minutes, stirring and flipping the potatoes occasionally.[1]

Soak the cut potatoes in ice cold water for one hour at room temperature. Drain well and pat dry with paper towels. Heat oil in a deep fryer to about 370 degrees. Heat the oven to 200 degrees to keep batches of fries warm.[2]

1. http://allrecipes.com/recipe/219634/chef-johns-french-fries
2. http://www.thespruce.com/french-fries-3056165

This information can be presented, for example, in area 1010.

Region 1008 can also comprise an area 1012 that allows a user to identify and locate additional sources where similar answers can be found. These are the additional and/or support sources described previously.

In addition, the answer information in region 1008 can be displayed as part of other information. For example, at the beginning of a list of search results.

Each of the areas can comprise information to allow the user to identify what the information in the area is describing (an answer, supporting sources, and so forth).

Example Machine Architecture and Machine-Readable Medium

Figure 11:
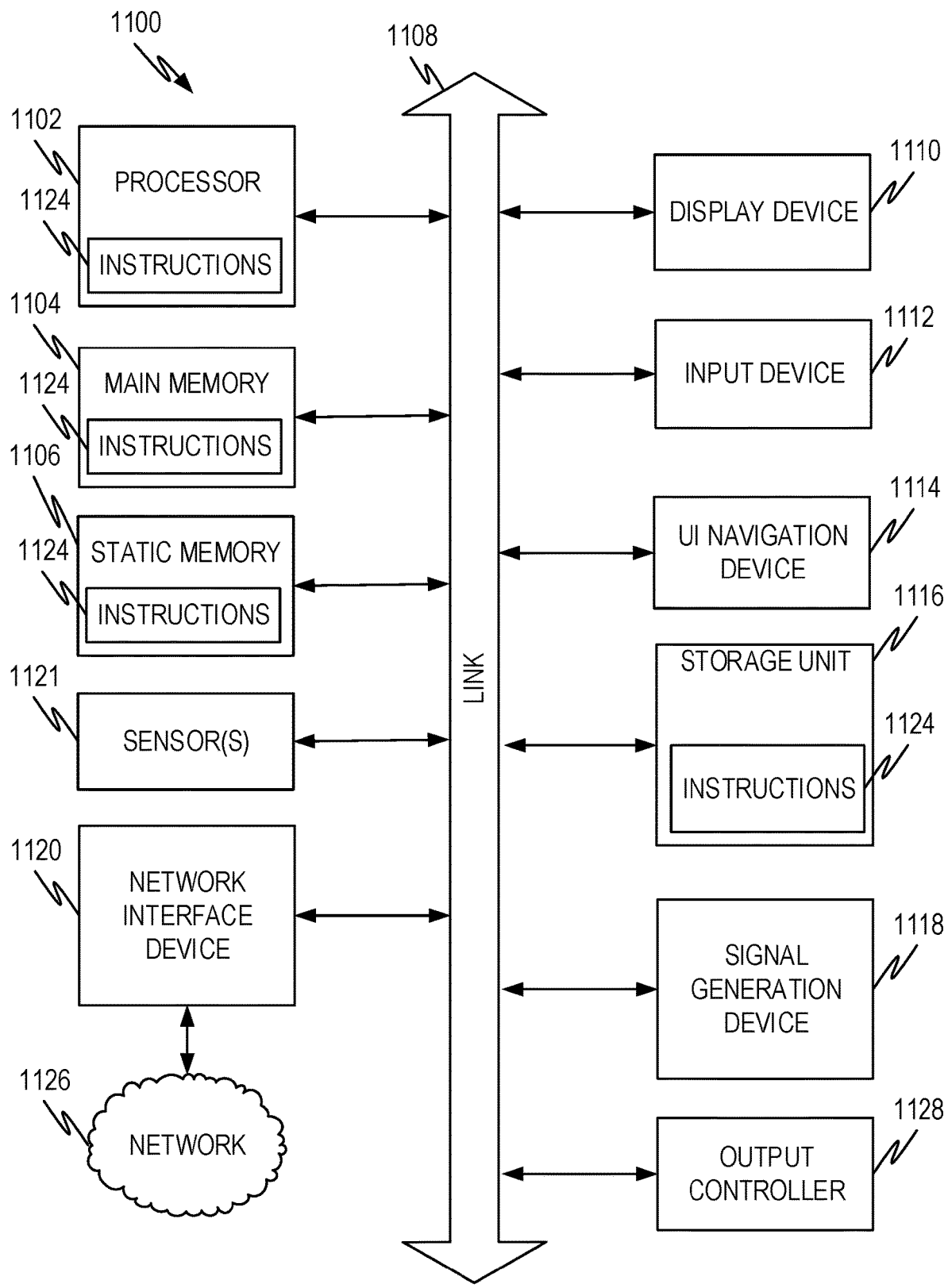
FIG. 11 illustrates a representative machine architecture suitable for implementing the systems and other aspects disclosed herein or for executing the methods disclosed herein.

FIG. 11 illustrates a representative machine architecture suitable for implementing the systems and other aspects disclosed herein or for executing the methods disclosed herein. The machine of FIG. 11 is shown as a standalone device (such as the mobile devices described herein), which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 11 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 1100 includes at least one processor 1102 (e.g., a central processing unit (CPU), a graphics processing unit (GPU), advanced processing unit (APU), or combinations thereof), one or more memories such as a main memory 1104, a static memory 1106, or other types of memory, which communicate with each other via link 1108. Link 1108 may be a bus or other type of connection channel. The machine 1100 may include further optional aspects such as a graphics display unit 1110 comprising any type of display. The machine 1100 may also include other optional aspects such as an alphanumeric input device 1112 (e.g., a keyboard, touch screen, and so forth), a user interface (UI) navigation device 1114 (e.g., a mouse, trackball, touch device, and so forth), a storage unit 1116 (e.g., disk drive or other storage device(s)), a signal generation device 1118 (e.g., a speaker), sensor(s) 1121 (e.g., global positioning sensor, accelerometer(s), microphone(s), camera(s), an eye tracking subsystem, and so forth), output controller 1128 (e.g., wired or wireless connection to connect and/or communicate with one or more other devices such as a universal serial bus (USB), near field communication (NFC), infrared (IR), serial/parallel bus, etc.), and a network interface device 1120 (e.g., wired and/or wireless) to connect to and/or communicate over one or more networks 1126.

Rather than the more conventional microprocessor, Neural Network chips can be used to implement embodiments of the present disclosure. Neural Network chips are specialized chips designed to execute various forms of neural networks and can be used in the MRC models or other machine learning models that are utilized in the embodiments. As such, they are suitable for use in implementing aspects of the present disclosure such as the machine learning models and other neural network aspects of the present disclosure. Based on the disclosure contained herein, those of skill in the art will know how to implement the embodiments of the present disclosure using one or more neural network chips.

Executable Instructions and Machine-Storage Medium

The various memories (i.e., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

Signal Medium

The term "signal medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

EXAMPLE EMBODIMENTS

Example 1

A computer implemented method, comprising:
receiving a plurality of ranked document segments relevant to a query submitted by a user;
selecting a subset of the ranked document segments based on a first threshold;
submitting the query and the subset of the ranked document segments to a trained machine reading comprehension model;
responsive to the submitting, receiving a plurality of extracted answers from at least some of the subset of the ranked document segments;
clustering the plurality of extracted answers into clusters;
eliminating clusters that have a number of extracted answers that fall below a second threshold thus leaving a number of remaining clusters;
selecting a direct answer and a number of corresponding support sources based on a third threshold from each of the remaining clusters;
selecting an answer format based on the number of remaining clusters; and
presenting the selected direct answers and corresponding support sources according to the selected answer format.

Example 2

The method of claim 1 wherein:
the first threshold is less than or equal to fifteen;
the second threshold is less than or equal to five;
the third threshold is less than or equal to two.

Example 3

The method of claim 1 wherein:
the first threshold is less than or equal to five;
the second threshold is less than or equal to two;
the third threshold is less than or equal to two.

Example 4

The method of claim 1 wherein the method is performed responsive to entry of the query by the user.

Example 5

The method of claim 1 wherein the selected direct answers are presented as part of search results responsive to the query.

Example 6

The method of claim 1 further comprising:
receiving feedback on the selected direct answers;
responsive to the feedback, adjusting at least one of the first threshold, the second threshold, and the third threshold.

Example 7

The method of claim 1 wherein clustering the plurality of extracted answers into clusters is based on edit distance between the plurality of extracted answers.

Example 8

The method of claim 1, 2, 3, 4, 5, 6, or 7 wherein selecting an answer format based on the number of remaining clusters comprises:
selecting a first answer format when the number of remaining clusters is equal to one; and
selecting a second answer format when the number of remaining clusters is greater than one.

Example 9

The method of claim 8 wherein:
the first answer format comprises:
one area where a single direct answer is presented; and
one area where a corresponding support segment of a document is presented with the single direct answer formatted to draw a user's eye; and
the second answer format comprises:
an area where multiple support segments are presented, each with a single direct answer formatted to draw the user's eye.

Example 10

A system comprising:
a processor and device-storage media having executable instructions which, when executed by the processor, cause the system to perform operations comprising:
receive a plurality of ranked document segments relevant to a query submitted by a user;
select a subset of the ranked document segments based on a first threshold;

submit the query and the subset of the ranked document segments to a trained machine reading comprehension model;

responsive to the submitting, receive a plurality of extracted answers from at least some of the subset of the ranked document segments;

cluster the plurality of extracted answers into clusters;

eliminate clusters that have a number of extracted answers that fall below a second threshold thus leaving a number of remaining clusters;

select a direct answer and a number of corresponding support sources based on a third threshold from each of the remaining clusters;

select an answer format based on the number of remaining clusters; and present the selected direct answers and corresponding support sources according to the selected answer format.

Example 11

The system of claim 10 wherein:
the first threshold is less than or equal to fifteen;
the second threshold is less than or equal to five;
the third threshold is less than or equal to two.

Example 12

The system of claim 10 wherein:
the first threshold is less than or equal to five;
the second threshold is less than or equal to two;
the third threshold is less than or equal to two.

Example 13

The system of claim 10 wherein the operations are performed responsive to entry of the query by the user.

Example 14

The system of claim 10 wherein the selected direct answers and corresponding support sources are presented as part of search results responsive to the query.

Example 15

The system of claim 10, 11, 12, 13 or 14, further comprising:
receive feedback on the selected direct answers;
responsive to the feedback, adjust at least one of the first threshold, the second threshold, and the third threshold.

Example 16

A computer implemented method, comprising:
receiving a plurality of ranked document segments relevant to a query submitted by a user;
selecting a subset of the ranked document segments based on a first threshold;
submitting the query and the subset of the ranked document segments to a trained machine reading comprehension model;
responsive to the submitting, receiving a plurality of extracted answers from at least some of the subset of the ranked document segments;
clustering the plurality of extracted answers into clusters;

eliminating clusters that have a number of extracted answers that fall below a second threshold thus leaving a number of remaining clusters;

selecting a direct answer and a number of corresponding support sources based on a third threshold from each of the remaining clusters;

selecting an answer format based on the number of remaining clusters; and presenting the selected direct answers and corresponding support sources according to the selected answer format.

Example 17

The method of claim 16 wherein:
the first threshold is less than or equal to fifteen;
the second threshold is less than or equal to five;
the third threshold is less than or equal to two.

Example 18

The method of claim 16 wherein:
the first threshold is less than or equal to five;
the second threshold is less than or equal to two;
the third threshold is less than or equal to two.

Example 19

The method of claim 16, 17 or 18 wherein the method is performed responsive to entry of the query by the user.

Example 20

The method of claim 16, 17, 18, or 19 wherein the selected direct answers are presented as part of search results responsive to the query.

Example 21

The method of claim 16, 17, 18, 19, or 20 further comprising:
receiving feedback on the selected direct answers;
responsive to the feedback, adjusting at least one of the first threshold, the second threshold, and the third threshold.

Example 22

The method of claim 16, 17, 18, 19, 20, or 21 wherein clustering the plurality of extracted answers into clusters is based on edit distance between the plurality of extracted answers.

Example 23

The method of claim 16, 17, 18, 19, 20, 21, or 22 wherein selecting an answer format based on the number of remaining clusters comprises:
selecting a first answer format when the number of remaining clusters is equal to one; and
selecting a second answer format when the number of remaining clusters is greater than one.

Example 24

The method of claim 23 wherein:
the first answer format comprises:
an area where a single direct answer is presented; and
an area where a corresponding support segment of a document is presented with the single direct answer formatted to draw a user's eye; and
the second answer format comprises:
an area where multiple support segments are presented, each with a single direct answer formatted to draw the user's eye.

Example 25

The method of claim 16, 17, 18, 19, 20, 21, 22, 23, or 24 wherein the trained machine learning model comprises:
a query and segment encoding layer;
a query and segment matching layer; and
an output layer.

Example 26

The method of claim 16, 17, 18, 19, 20, 21, 22, 23, 24, or 25 wherein the method is incorporated into a search system.

Example 27

The method of claim 16, 17, 18, 19, 20, 21, 22, 23, 24, or 25 wherein the method is incorporated into a personal digital assistant system.

Example 28

The method of claim 16, 17, 18, 19, 20, 21, 22, 23, 24, 25, 26 or 27 further comprising selecting a number of clusters based on the highest ranking answer in each cluster.

Example 29

An apparatus comprising means to perform a method as in any preceding claim.

Example 30

Machine-readable storage including machine-readable instructions, when executed, to implement a method or realize an apparatus as in any preceding claim.

CONCLUSION

In view of the many possible embodiments to which the principles of the present invention and the forgoing examples may be applied, it should be recognized that the examples described herein are meant to be illustrative only and should not be taken as limiting the scope of the present invention. Therefore, the invention as described herein contemplates all such embodiments as may come within the scope of the following claims and any equivalents thereto.

What is claimed is:
1. A computer implemented method, comprising:
receiving ranked document segments relevant to a query submitted by a user;
extracting potential answers for the query from the ranked document segments;
clustering the potential answers into several clusters;
eliminating clusters from the several clusters that have a number of potential answers that fall below a threshold, thus leaving a number of remaining clusters;
selecting, from each cluster of potential answers in the remaining clusters, a direct answer for the query;
selecting an answer format based on the number of remaining clusters, wherein a first answer format is selected when the number of remaining clusters is one, and a second answer format is selected when the number of remaining clusters is greater than one;
when the first answer format is selected, presenting the direct answer selected from the remaining cluster according to the first format to indicate general consensus with respect to the direct answer; and
when the second answer format is selected, presenting direct answers selected from the remaining clusters according to the second format to indicate lack of general consensus with respect to the direct answers.

2. The method of claim 1 wherein:
the threshold is less than or equal to five.

3. The method of claim 1 wherein:
the threshold is less than or equal to two.

4. The method of claim 1 wherein the method is performed responsive to entry of the query by the user.

5. The method of claim 1 wherein the direct answer or the direct answers are presented as part of search results responsive to the query.

6. The method of claim 1 wherein clustering the extracted answers into the several clusters is based on edit distance between answers in the extracted answers.

7. The method of claim 1 wherein:
the first answer format comprises:
a first area where the direct answer is presented; and
area second where a corresponding support segment of a document from which the direct answer was extracted is presented; and
the second answer format comprises:
a third area where multiple support segments of documents from which the direct answers were extracted are presented, each support segment presented to indicate a correspondence with a single direct answer.

8. A system comprising:
a processor and device-storage media having executable instructions which, when executed by the processor, cause the system to perform operations comprising:
receiving ranked document segments relevant to a query submitted by a user;
extracting potential answers for the query from the ranked document segments;
clustering the plurality of potential answers into clusters of potential answers;
eliminating clusters from the plurality of clusters that have a number of potential answers therein that fall below a threshold thus leaving a number of remaining clusters of potential answers;
selecting an answer format based on the number of remaining clusters, wherein a first answer format is selected when the number of remaining clusters is one, and a second answer format is selected when the number of remaining clusters is greater than one;
when the number of remaining clusters is one, presenting a potential answer from the remaining cluster as a direct answer to the query in accordance with the first answer format to indicate a consensus with respect to the direct answer; and when the number of remaining clusters is greater than one, presenting potential answers from the respective remaining clusters as direct answers to the query in accordance with the second answer format to indicate a lack of consensus with respect to the direct answers.

9. The system of claim 8 wherein:
the threshold is less than or equal to five.

10. The system of claim 8 wherein:
the threshold is less than or equal to two.

11. The system of claim 8 wherein the operations are performed responsive to entry of the query by the user.

12. The system of claim 8 wherein the direct answer or the direct answers are presented as part of search results responsive to the query.

13. The system of claim 8 wherein clustering the plurality of potential answers into clusters of potential answers is based on edit distance between the potential answers.

14. The system of claim 8 wherein:
the first answer format comprises:
    a first area where the direct answer is presented; and
    a second area where a segment of a document from which the direct answer was extracted is presented; and
the second answer format comprises:
    area third where multiple segments from which the direct answers were respectively extracted are presented, wherein each segment in the multiple segments is displayed together with a respective direct answer that was extracted from the segment.

15. A computer storage medium comprising executable instructions that, when executed by a processor of a machine, cause the machine to perform acts comprising:
receive a plurality of ranked document segments relevant to a query submitted by a user;
select a subset of the ranked document segments based on a first threshold;
submit the query and the subset of the ranked document segments to a trained machine reading comprehension model;
responsive to the submitting, receive a plurality of extracted answers from at least some of the subset of the ranked document segments;
cluster the plurality of extracted answers into clusters;
eliminate clusters that have a number of extracted answers that fall below a second threshold thus leaving a number of remaining clusters;
select a direct answer and a number of corresponding support sources based on a third threshold from each of the remaining clusters;
select an answer format based on the number of remaining clusters, comprising:
select a first answer format when the number of remaining clusters is equal to one; and
select a second answer format when the number of remaining clusters is greater than one; and
present the selected direct answers and corresponding support sources according to the selected answer format.

16. The medium of claim 15 further comprising:
receive feedback on the selected direct answers;
responsive to the feedback, adjust at least one of the first threshold, the second threshold, and the third threshold.

17. The computer-implemented method of claim 1, further comprising:
when the first answer format is selected, presenting an identifier of at least one source for the direct answer, the identifier of the at least one source identifies a document that includes the direct answer.

18. The computer-implemented method of claim 1, further comprising:
submitting the query and the ranked document segments to a trained machine reading comprehension model, wherein the trained machine reading comprehension extracts the potential answers from the ranked document segments.

19. The system of claim 8, the operations further comprising
when the first answer format is selected, present an identifier of at least one source for the direct answer, the identifier of the at least one source identifies a document that includes the direct answer.

20. The system of claim 8, the operations further comprising:
submit the query and the ranked document segments to a trained machine reading comprehension model, wherein the trained machine reading comprehension extracts the potential answers from the ranked document segments.

* * * * *